Patented Aug. 27, 1929.

1,726,357

UNITED STATES PATENT OFFICE.

BORIS N. LOUGOVOY, OF MONTCLAIR, NEW JERSEY, ASSIGNOR TO ELLIS-FOSTER COMPANY, OF MONTCLAIR, NEW JERSEY, A CORPORATION OF NEW JERSEY.

PROCESS FOR REDUCING THE VISCOSITY OF CELLULOSE ESTERS.

No Drawing.   Application filed June 9, 1926. Serial No. 114,862.

This invention relates to a process for reducing the viscosity of cellulose esters such as cellulose nitrate (so-called nitrocellulose) as well as to other cellulose esters, such as cellulose acetate, cellulose butyrate, and the like.

Cellulose esters, such as nitrocellulose as usually and most easily prepared by direct nitration are of the high viscosity type, that is, when dissolved in certain proportions in some suitable solvent, such as, for example, ethyl and butyl acetates, yield solutions of extremely high viscosity. High viscosity necessarily limits the solubility of a cellulose ester, for solutions having much solid content are too viscous to flow out well, so that when such high viscosity materials are to be used, for example, in lacquers, the amount of the cellulose compound which can be dissolved in the solvents employed, is limited by the viscosity characteristics of the cellulose ester. For use in lacquers, this is particularly objectionable, since the amount of high viscosity cellulose ester which may be employed, is so little that upon evaporation of the solvent or volatile portion, the film remaining is extremely thin.

In order to overcome this particularly objectionable feature, it is of advantage to prepare a cellulose ester of low viscosity characteristic, that is, one which may be dissolved in suitable solvents to yield solutions considerably less viscous than comparative solutions of the so-called high viscosity cellulose esters. Such material may be dissolved in substantially greater amount in any given solvent, and yet produce solutions having no greater viscosity.

A satisfactory rapid method of determining the viscosity of cellulose esters is the so-called "falling ball" method, and is conducted substantially as follows:—

A solution is prepared consisting of 12.2 parts, by weight, of nitrocellulose, 22 parts by weight of 95 per cent denatured alcohol, 48.3 parts by weight of 90° benzol, and 17.5 parts by weight of 99 per cent ethyl acetate. Said solution contains 12.2 per cent by weight of nitrocellulose, or about 1 lb. of nitrocellulose per gallon of solution. A glass tube 14 inches long and 1 inch in diameter is closed at the lower end with a stopper, two file marks are made on the glass two inches from each end (i. e. exactly 10 inches apart) and the solution to be tested is brought to a temperature of 25° C., and then poured into the tube. A steel ball $\frac{5}{16}$ inch in diameter and weighing 2.043 grams is dropped into the solution, after being moistened with the solvent employed, and the time required to traverse the 10 inch column of solution is noted on a stop watch. The viscosity is reported in seconds. This method may be modified, using other, and perhaps more suitable solvents, and at best is but a method for determining relative viscosity, and all results, as reported herein, were obtained in such manner.

Knowing the very different viscosities of any given nitrocellulose when dissolved in various solvents, I considered it possible that each particular solvent had a different dispersing or peptizing action on the nitrocellulose, and those solvents which give solutions of lowest viscosity had the greatest dispersing or peptizing action on the nitrocellulose. Solvents such as acetone, and to a lesser extent, ethyl acetate, are particularly notable in this respect. Accordingly, it was believed that if nitrocellulose of high viscosity characteristic was dissolved in some solvent such as acetone and precipitated from said solvent by the addition of a liquid non-solvent for nitrocellulose, such as, for example, water, or other suitable liquid, that said precipitated nitrocellulose would be of lower viscosity than the untreated nitrocellulose. This was demonstrated as follows, and this procedure may be considered one form of my invention.

50 parts by weight of a nitrated cotton, previously found to have a standard viscosity of 20 seconds, was dissolved in 320 parts by weight of acetone, and the nitrocellulose was then precipitated with about 840 parts by weight of a mixture containing 20 volumes of water to 80 volumes of acetone. Mechanical agitation was employed and the water-acetone mixture introduced quite slowly to avoid a too quick or violent precipitation. Agitation was stopped after all the diluent was added and the solids allowed to settle out, the clear liquid being run off. The precipitated solids finally were well washed with water, the excess water being mechanically squeezed therefrom and denatured alcohol was then added to displace this water. The product was of lighter color than the original material and the standard viscosity was found to be 12 seconds, as against 20 seconds, for the original material. Still further reduction in viscosity was obtained by repeated treatments in the same manner.

In another series of experiments 50 parts by weight of a nitrated cotton having a viscosity of 100 seconds was dissolved in acetone and the temperature of the solution was brought to 43° C. This produced a solution in which the nitrocellulose had been dispersed even more than in corresponding solutions in the cold. The nitrocellulose was then precipitated gradually by introduction of water, also maintained at a temperature of 43° C. Violent mechanical agitation was employed in order to produce a very fine precipitate. The product was then well washed with water and with alcohol as in the preceding case and after drying was tested by the standard viscosity method and found to have a viscosity of 32 seconds, as against an original viscosity of 100 seconds. This corresponds to a viscosity reduction of 68 per cent.

Other solvents of good dispersing power, such as, for example, ethyl acetate, may also be employed for these purposes, and other cellulose esters may be treated in like manner by employing suitable solvents for these materials.

While the foregoing disclosure relates particularly to a process for reducing the viscosity of nitrocellulose by dissolving nitrocellulose in a solvent of high dispersing power and then precipitating said nitrocellulose therefrom by means of a liquid non-solvent, whereby a nitrocellulose of lower viscosity is obtained, I do not consider my invention limited to such precise procedure, but may employ various modifications which depart substantially from the illustrative procedure, but which nevertheless remain within the scope and spirit of the invention. I regard any method of separating nitrocellulose from a solvent of high dispersing power by which separation step nitrocellulose of lower viscosity is obtained to be within the purview of my invention. In other words, I consider within the scope of my invention a process for reducing the viscosity of cellulose ester by dissolving the ester in a solvent of high dispersing power, and then separating the cellulose ester therefrom, whereby an ester of lower viscosity is obtained. It should be noted that by proceeding in accordance with my invention no chemical denitrating treatment is involved. However, I do not preclude the treatment of nitrocellulose and other cellulose esters with chemical agents in some cases, such treatment preceding or following the separation step described in the foregoing. Finally, I do not preclude the addition to the solvent of high dispersing power containing dissolved nitrocellulose or other cellulose ester, a chemical compound such as a small amount of ammonium hydroxide or other alkaline substance, followed by precipitation with a liquid non-solvent, whereby the joint effect of physical and chemical disintegration take place simultaneously.

What I claim is:—

1. A process for reducing the viscosity of a cellulose ester, which consists in dissolving said cellulose ester in a solvent of high dispersing power and then separating the cellulose ester therefrom by gradual dilution of the solution with a mixture of said solvent and a non-solvent liquid miscible with said solvent, whereby a cellulose ester of lower viscosity is obtained.

2. A process of reducing the viscosity of a cellulose ester, which consists in dissolving said cellulose ester in acetone and then precipitating the cellulose ester therefrom by adding a mixture of liquids freely miscible with acetone, but including a liquid in which the cellulose ester is insoluble, whereby a cellulose ester of lower viscosity is precipitated.

3. A process for reducing the viscosity of a cellulose ester, which consists in dissolving said cellulose ester in acetone, and then precipitating the cellulose ester therefrom by very gradual dilution with water and acetone mixture, the latter being added in such amount as to precipitate an ester of substantially decreased viscosity as compared with the ester initially used.

4. A process for reducing the viscosity of a cellulose ester, which consists in dissolving said cellulose ester in a solvent of high dispersing power and then precipitating the cellulose ester therefrom by the very gradual addition of a mixture of a solvent of such ester and a non-solvent thereof, while the entire mass is being well agitated, such precipitation being effected at a temperature substantially above ordinary room temperature, but well below the boiling point of the mixture, and recovering the precipitated ester, whereby an ester of substantially lower viscosity is obtained.

5. A process for reducing the viscosity of a cellulose ester, which consists in dissolving said cellulose ester in a solvent of high dispersing power and then precipitating the cellulose ester therefrom by the very gradual addition of a mixture of a solvent of such ester and a non-solvent thereof, while the entire mass is being well agitated, such precipitation being effected at a temperature of about 43° C., and recovering the precipitated ester, whereby an ester of substantially lower viscosity is obtained.

BORIS N. LOUGOVOY.